United States Patent [19]

Sepelak

[11] 4,115,193

[45] Sep. 19, 1978

[54] NUCLEAR REACTOR PRESSURE VESSEL SUPPORT SYSTEM

[75] Inventor: George R. Sepelak, McMurray, Pa.

[73] Assignee: The United States of America as represented by the United States Department of Energy, Washington, D.C.

[21] Appl. No.: 715,255

[22] Filed: Aug. 17, 1976

Related U.S. Application Data

[63] Continuation of Ser. No. 571,836, Apr. 25, 1975, abandoned.

[51] Int. Cl.² .............................................. G21C 13/06
[52] U.S. Cl. ...................................... 176/87; 176/38; 176/40
[58] Field of Search ............................. 176/38, 40, 87; 220/319, 327, 328

[56] References Cited

U.S. PATENT DOCUMENTS

| 2,890,009 | 6/1959 | Chapellier | 176/87 |
| 3,819,478 | 6/1974 | Thorel et al. | 176/40 |
| 3,867,254 | 2/1975 | Brandstetter | 176/87 |

OTHER PUBLICATIONS

PMC-74-01, CONF-741087, Proposed Reference Design for the Clinch River Breeder Reactor Plant (10/74), pp. 20-24.

Primary Examiner—Samuel W. Engle
Assistant Examiner—S. A. Cangialosi
Attorney, Agent, or Firm—Dean E. Carlson; R. G. Erdley; C. L. McHale

[57] ABSTRACT

A support system for nuclear reactor pressure vessels which can withstand all possible combinations of stresses caused by a postulated core disrupting accident during reactor operation. The nuclear reactor pressure vessel is provided with a flange around the upper periphery thereof, and the flange includes an annular vertical extension formed integral therewith. A support ring is positioned atop of the support ledge and the flange vertical extension, and is bolted to both members. The plug riser is secured to the flange vertical extension and to the top of a radially outwardly extension of the rotatable plug. This system eliminates one joint through which fluids contained in the vessel could escape by making the fluid flow path through the joint between the flange and the support ring follow the same path through which fluid could escape through the plug risers. In this manner, the sealing means to prohibit the escape of contained fluids through the plug risers can also prohibit the escape of contained fluid through the securing joint.

4 Claims, 2 Drawing Figures

NUCLEAR REACTOR PRESSURE VESSEL SUPPORT SYSTEM

BACKGROUND OF THE INVENTION

This invention was made in the course of, or under, a contract with the U.S. Energy Research and Development Administration.

This is a continuation of application Ser. No. 571,836, filed Apr. 25, 1975, now abandoned.

This invention relates generally to nuclear reactors and more particularly to a support system for nuclear reactor pressure vessels.

The nuclear reactor pressure vessel is one of the main components in any nuclear reactor system, for it is within this pressure vessel that the fission reaction which is the object of any nuclear reactor system occurs. To provide redundancy in the sealing of the nuclear reactor in the unlikely event of an accident, so as to further protect the external environment, the entire nuclear reactor primary system is enclosed within a containment structure. The containment structure, generally fabricated of reinforced concrete, is comprised of a plurality of individual cells, and each cell encloses one primary system component, thereby isolating each primary system component. In the instance of the pressure vessel, the containment structure forms a well radially surrounding the pressure vessel. This containment well is generally placed apart from the pressure vessel so that inspection and monitoring of the external side of the pressure vessel can occur.

As is customary in the nuclear field, the pressure vessel is not self-supporting, but is mounted on and supported by the wall of the containment well. The means of mounting the pressure vessel on the containment structure wall must take into account the postulated accidents mandated by safety considerations which impose substantial stresses on the pressure vessel.

One means of securing the pressure vessel to the containment structure in the prior art was by means of a double-bolting system. A flange extended around upper periphery of the pressure vessel, and this flange is bolted to a stationary outer ring. The stationary outer ring is in turn, bolted to a support ledge of the containment well. The plug riser, through which the rotatable plugs situated within the pressure vessel is supported, is then secured to the stationary outer ring. For ease of design, the tops of the rotatable plugs, the stationary outer ring, and the support ledge are substantially at the same elevation.

The use of the outer ring bolted to the flange of the pressure vessel introduces a joint which is open to both the external environment and the interior of the pressure vessel. This joint has to be sealed to prevent the escape of fluids from the interior of the pressure vessel. The addition of such a seal further complicated the support and stress problems.

SUMMARY OF THE INVENTION

The aforementioned problems of the prior art are eliminated by this invention by providing a pressure vessel flange around the outer periphery of the pressure vessel, and a vertical extension of the pressure vessel flange formed integral therewith. The vertical extension and the containment support ledge are located at the same elevation, and the support ring is located on the upper surface of both. The support ring is then bolted to both the containment structure and the flange vertical extension. Secured to the flange vertical extension is the plug riser, which is additionally secured to a radially outward extension of the rotatable plug. In this location, the means of sealing to prevent the escape of contained fluid through the plug riser also functions to seal the joint between the pressure vessel flange and the stationary outer ring, thereby eliminating the need for a separate seal for the latter joint.

BRIEF DESCRIPTION OF THE DRAWINGS

Reference is now made to the description of the preferred embodiment, taken in connection with the accompanying drawings, in which.

DESCRIPTION OF THE PREFERRED EMBODIMENT

Figure 1:
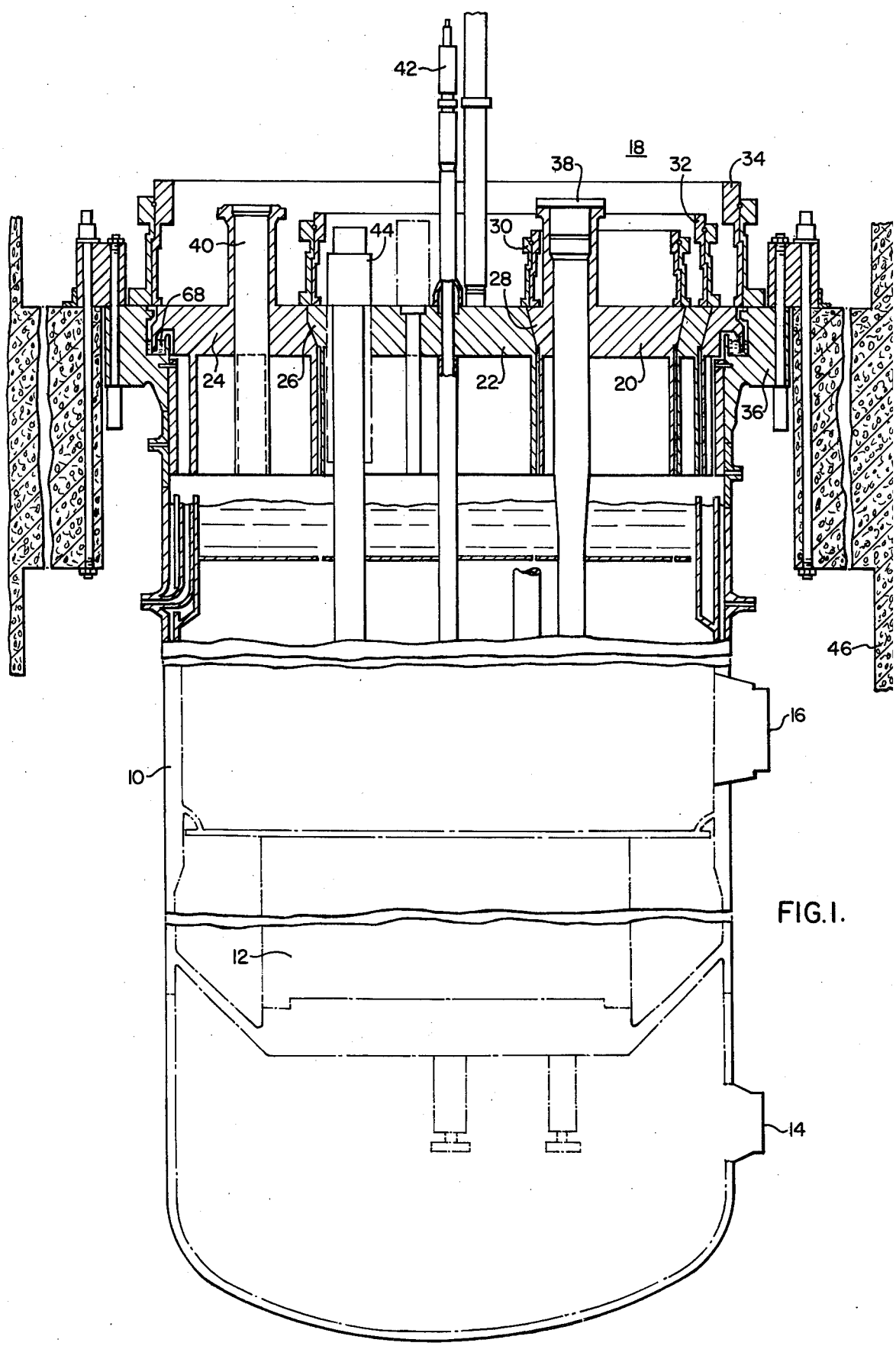
FIG. 1 is an elevational view of a nuclear reactor pressure vessel utilizing this invention.

Throughout the description which follows, like reference characters indicate like members of the various figures of the drawings.

Referring now more particularly to FIG. 1, a nuclear reactor vessel 10 houses a nuclear core 12 comprised of a plurality of assemblies of fuel elements of fissionable and fissile material. Coolant flow inlet means 14 and coolant flow outlet means 16, for the ingress and egress of reactor coolant, are formed integral with and through the cylindrical vessel walls 10. The reactor core and vessel internals do not form a part of this invention. For a more detailed description of the reactor core and pressure vessel internals, reference may be had to the application of William Pennell and William Rowan, Ser. No. 503,148, filed Sept. 4, 1974 for a nuclear reactor, and assigned to the same assignee as the present invention. The pressure vessel 10 is sealed at the top by a nuclear reactor closure head 18. In the liquid-metal fast breeder reactor shown, the closure head 18 is comprised of a plurality of rotatable plugs 20, 22 and 24. The large plug 24 is of annular configuration and is coaxial with the pressure vessel 10. The intermediate plug 22, also of annular configuration, is positioned within an opening 26 in the large plug 24. The circular small plug 20 is eccentric to the intermediate plug 22 and the large plug 24, and is situated within an eccentric opening 28 in the intermediate plug 22. The intermediate plug 22 rotatably supports the small plug 20 through an annular plug riser 30. The intermediate plug 22 is rotatably supported by the large plug 24 through the annular plug riser 32. The large plug 24 is rotatably supported by the flange 36 of the pressure vessel 10 through the annular plug riser 34. The plug riser arrangements do not form a part of this invention. For a detailed description of desirable constructions of plug risers, references may be to application for U.S. letters patent Ser. No. 537,474 filed Dec. 30, 1974 entitled Rotating Plug Bearing and Seal Arrangement in the name of Elman E. Wade.

The plugs 20, 22, and 24, support a plurality of penetrations, typical of which are the in-vessel transfer machine 38, the ex-vessel transfer machine 40, control rod drives 42 and surveillance ports 44. Radially surrounding the pressure vessel 10 is the containment structure 46. For a more detailed description of such penetrations reference may be had to the aforementioned Pennell-Rowan application which does not form a part of this invention.

Figure 2:
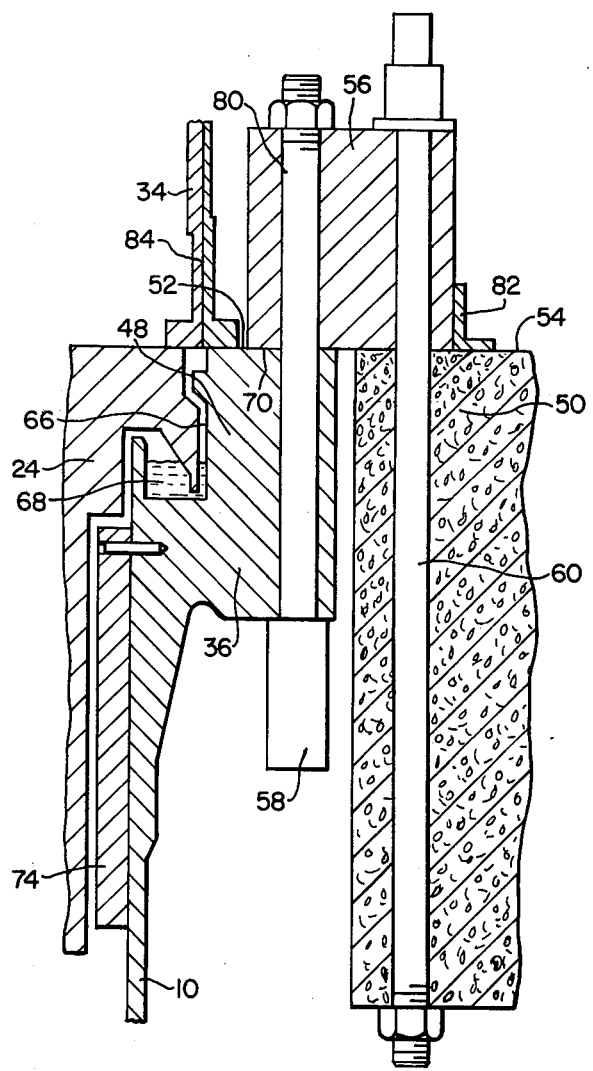
FIG. 2 is a detailed view of the vessel flange, sealing and support structure of this invention.

Referring now to FIG. 2 which compreses a detailed view of the pressure vessel support structure, the pressure vessel flange 36 extends around the upper periphery of the pressure vessel 10. Formed integral with the flange 36 is an annular vertical extension 48. The containment structure well 46 has a containment support ledge 50 which radially surrounds the pressure vessel 10. As previously mentioned, the large plug 24 is positioned within the nuclear reactor pressure vessel 10. The upper surfaces of the plug 24, the vertical extension 48 of the flange 36 and the support ledge 50 are at substantially the same elevations. Located on the upper surface 52 of the vertical extension 48, and the upper surface 54 of the support ledge 50 is a support ring 56. The support ring 56 is secured, by means of bolts 58 which pass through aligned opening 80 formed in ring 56 and flange 36, to the vertical extension 48 of the flange 36. The support ring 56 is also secured, by a plurality of bolts 60, to the support ledge 50. If so desired, a thermal pad (not shown) can be located between the support ring 56 and the support ledge 50 to insulate the hotter metal support ring 56 from the concrete support ledge 50. An angular reactor cavity seal 82 is secured to both the support ledge 50 and the support ring 56 radially outwardly from securing bolts 60 to prohibit the escape of fluids. This double-bolting method of securing the pressure vessel 10 to the containment structure 46 provides great capability for energy absorption by plastic deformation of the bolts to limit the load imparted to the support system. Forces imparted on the bolts 58, 60 by the pressure vessel 10, in the unlikely event of an accident, will cause the bolts 58, 60 to stretch. The stretching of the bolts 58, 60 will absorb the forces exerted by the pressure vessel 10, and though some bolts 58, 60 will shear, sufficient bolts 58, 60 will remain to support the pressure vessel 10.

The large plug 24 has a radially outward extension 62 located adjacent to the flange vertical extension 48. The annular support riser 34, by which the flange 36 and the vertical extension 48 support the large plug 24, is secured respectively to the plug radially outward extension 62 and the flange vertical extension 48. An annular space 66 is formed between the flange vertical extension 48 and the plug radial extension 62. This annular space 66 could serve as an escape path for contained fluid from inside the pressure vessel 10 to the external environment through the plug riser 34. Means 68 for sealing the annular space 66 are located within the annular space 66. As shown the sealing means 68 comprises a liquid dip seal, in which liquid sodium is present during both operation and refueling. As the contained fluid attempts to escape it exerts a pressure on the liquid sodium in the dip seal 68, and the liquid sodium rises within the annular space 66. The annular space 66, and the annular plug riser space 84 between the two elements of the plug riser 34 with which it is in fluid communication, is sealed. Therefore, the gas in these two spaces 66, 84 is compressed, and forces the liquid sodium down the annular space 66. In this manner, the fluid from the inside of the pressure vessel 10 is prevented from escaping.

In addition to preventing the escape of contained fluids through the plug riser 34, the sealing means 68 also prohibit the escape of contained fluid through the joint 70 between the stationary outer ring 56 and the flange vertical extension 48. By positioning the latter jointure downstream from seal 68, the sealing means 68 seal two possible fluid escape routes with a single seal. If radiation streaming is a concern along a path formed between vessel 10 and the outer periphery of ring 24, an annular shearing ring 74 may be secured to the pressure vessel 10 and the flange 36 in the transition area from the pressure vessel 10 to the flange 36. This ring 74 reduces the radiation streaming which may flow through the annular space 66.

Thus, the disclosed invention provides a system for supporting the nuclear reactor pressure vessel within the containment, and eliminates the need for one of the seals of the prior art by enabling a necessary seal to seal two fluid escape routes.

I claim as my invention:

1. A nuclear reactor pressure vessel support system comprising:
   a generally cylindrical nuclear reactor pressure vessel having a fluid contained therein;
   a pressure vessel flange around the upper periphery of said pressure vessel, said flange having an annular vertical extension formed integral therewith, said vertical extension having width less than the radial width of said flange;
   a containment well radially surrounding said pressure vessel, said well having a containment support ledge thereon adjacent said flange extension;
   a support ring located on the upper surface of, and secured to, said flange vertical extension and said containment support ledge;
   a rotatable plug positioned within said pressure vessel, said rotatable plug having a radial extension formed integral therewith around the outer periphery thereof, said plug radial extension being located adjacent said flange vertical extension, said plug radial extension and said flange vertical extension forming a first annular space therebetween;
   an annular plug riser secured to the upper surface of said plug radial extension and the upper surface of said flange vertical extension, said flange vertical extension rotatably supporting said plug through said plug riser, said plug riser comprising two riser elements having a second annular space therebetween, said second annular space being in fluid communication with said first annular space; and
   sealing means for preventing the escape of contained fluids through said second annular space disposed within said first annular space adjacent said flange vertical extension, said sealing means preventing the escape of contained fluids through the joint formed by said flange vertical extension and said support ring.

2. The system according to claim 1 wherein the upper surface of said flange vertical extension and the upper surface of the containment support ledge are at the same elevation.

3. The system according to claim 1 wherein said support ring is secured to said flange vertical extension and said containment support ledge by a plurality of bolts.

4. The system according to claim 1 wherein an annular radiation shielding ring is secured to said pressure vessel adjacent said vessel flange.

* * * * *